US010754709B2

(12) United States Patent
Jain et al.

(10) Patent No.: US 10,754,709 B2
(45) Date of Patent: Aug. 25, 2020

(54) SCALABLE TASK SCHEDULING SYSTEMS AND METHODS FOR CYCLIC INTERDEPENDENT TASKS USING SEMANTIC ANALYSIS

(71) Applicant: Ciena Corporation, Hanover, MD (US)

(72) Inventors: Mudit Jain, New Delhi (IN); Pravin Tripathi, Lucknow (IN); Rahul Pande, Gurgaon (IN); Pankaj Kumar Joshi, New Delhi (IN)

(73) Assignee: Ciena Corporation, Hanover, MD (US)

( * ) Notice: Subject to any disclaimer, the term of this patent is extended or adjusted under 35 U.S.C. 154(b) by 84 days.

(21) Appl. No.: 16/184,427

(22) Filed: Nov. 8, 2018

(65) Prior Publication Data

US 2020/0097333 A1   Mar. 26, 2020

(30) Foreign Application Priority Data

Sep. 26, 2018   (IN) .............................. 201811036376

(51) Int. Cl.
| G06F 9/46 | (2006.01) |
| G06F 9/52 | (2006.01) |
| G06F 9/48 | (2006.01) |
| G06N 20/00 | (2019.01) |

(52) U.S. Cl.
CPC .............. G06F 9/52 (2013.01); G06F 9/4881 (2013.01)

(58) Field of Classification Search
CPC ........ G06F 9/4881; G06F 9/5038; G06F 9/52; G06F 8/75; G06F 8/40; G06F 8/42; G06F 8/43; G06F 8/44; G06F 8/45; G06F 8/425; G06F 8/433; G06F 8/436; G06F 8/445; G06F 8/456; G06F 8/452; G06F 16/9024; G06F 16/284; G06F 16/285; G06F 16/288; G06F 16/287

See application file for complete search history.

(56) References Cited

U.S. PATENT DOCUMENTS

| 8,761,610 | B2 | 6/2014 | Frankel | |
| 2009/0313600 | A1* | 12/2009 | Ayers | G06F 8/433 |
| | | | | 717/106 |
| 2010/0241250 | A1* | 9/2010 | Chen | G05B 13/042 |
| | | | | 700/30 |
| 2011/0268439 | A1* | 11/2011 | Gerstel | H04L 45/124 |
| | | | | 398/34 |

(Continued)

OTHER PUBLICATIONS

Union-Find Algorithms, Princeton Edu., pp. 1-40.

(Continued)

*Primary Examiner* — Emerson C Puente
*Assistant Examiner* — Zhi Chen
(74) *Attorney, Agent, or Firm* — Clements Bernard Walker; Lawrence A. Baratta, Jr.; Christopher L. Bernard

(57) ABSTRACT

Scalable task scheduling systems and methods for cyclic interdependent tasks using semantic analysis include, for a software application including a plurality of tasks which are cyclic interdependent tasks, segmenting the plurality of tasks into a task graph with vertices including the plurality of tasks and edges including interdependencies between the plurality of tasks; processing the task graph into a dependency graph which is a Directed Acyclic Graph (DAG); and causing execution of the plurality of tasks in a parallel manner based on the dependency graph.

15 Claims, 11 Drawing Sheets

(56) References Cited

U.S. PATENT DOCUMENTS

2017/0293666 A1* 10/2017 Ragavan ................. G06N 5/02
2018/0365353 A1* 12/2018 Devereux .............. G16C 20/00
2019/0102736 A1*  4/2019 Hudson ............. G06Q 10/0875
2020/0082243 A1*  3/2020 Jin .......................... G06N 3/04

OTHER PUBLICATIONS

Gyung-Leen Park et al., Mapping of Parallel Tasks to Multiprocessors with Duplication, 1060-3425198, 1998, IEEE, pp. 1-10.
Chokchai Leangsuksun et al., Designs and Experiments on Heterogeneous Mapping Heuristics, 0-8186-5592-519/94, 1994, IEEE, pp. 17-22.
M. Jahanshahi et al., A New Approach for Task Scheduling in Distributed Systems Using Learning Automata, Proceedings of the IEEE, International Conference on Automation and Logistics, Shenyang, China, Aug. 2009, 978-1-4244-4795-4/09, 2009,IEEE, pp. 62-67.
Donald B. Johnson, Finding All the Elementary Circuits of a Directed Graph, Siam J. Comput. vol. 4, No. 1, Mar. 1975, pp. 77-84.
CS161, Notes on Strongly Connected Components, Winter 2011, Handout #16, pp. 1-5.
Darrell Whitley et al., the Traveling Salesman and Sequence Scheduling: Quality Solutions Using Genetic Edge. Recombination, ResearchGate, Publication 2527549, Article-Aug. 2002.

* cited by examiner

SCALABLE TASK SCHEDULING SYSTEMS AND METHODS FOR CYCLIC INTERDEPENDENT TASKS USING SEMANTIC ANALYSIS

FIELD OF THE DISCLOSURE

The present disclosure generally relates to computer application execution via multi-core processors. More particularly, the present disclosure relates to scalable task scheduling systems and methods for cyclic interdependent tasks using semantic analysis.

BACKGROUND OF THE DISCLOSURE

Conventionally, many computer applications cannot utilize the full potential of high-speed multi-core processors. This is because of the sequential nature of processing of computer applications. For example, a variety of legacy applications are designed as monolith software applications. The inability to realize the potential of high-speed multi-core processors is further due to high inter-dependence of tasks and also due to circular dependencies among group of tasks. This in effect gives rise to scalability issues. As described herein, a task is a unit of execution or a unit of compute work. A task can also be referred to as a process, lightweight process, thread (for execution), step, request, function call, look up query, etc. Also, there exist many Central Processor Unit (CPU) scheduling techniques such as First Come First Serve (FCFS) scheduling, Shortest-Job-First (SJF) scheduling, Priority scheduling, Round Robin (RR) scheduling, Multilevel Queue scheduling, and the like. However, these techniques do not work on inter-dependencies/circular dependencies between tasks. There are other scheduling techniques which work on inter-dependencies, but they fail to work with circular dependencies and restrict scalability due to a domino effect of dependent tasks.

Examples of computer applications with inter-dependencies/circular dependencies between tasks include network simulation, verification, planning tools, etc. related to networks. For example, in optical (photonic) networks, a computer application can be used to verify a network design, i.e., the validity of photonic links across the network using computationally intense simulations. Further, the time required to complete such computationally intense simulations is exponentially proportional to the size of the network, the number of branches in the network, and the number of optical links to validate. As described above, the inter-dependencies/circular dependencies between tasks cause difficulty in exploiting multi-core processors with such validation applications.

BRIEF SUMMARY OF THE DISCLOSURE

In an embodiment, a scalable task scheduling method for cyclic interdependent tasks includes, for a software application including a plurality of tasks which are cyclic interdependent tasks, segmenting the plurality of tasks into a task graph with vertices including the plurality of tasks and edges including interdependencies between the plurality of tasks; processing the task graph into a dependency graph which is a Directed Acyclic Graph (DAG); and causing execution of the plurality of tasks in a parallel manner based on the dependency graph. The scalable task scheduling method can further include utilizing semantic analysis to predict input and output for the plurality of tasks and utilizing data balls which are predicted outputs as inputs to one or more tasks. The processing the task graph can include determining one or more islands in the task graph which are disconnected completely from the rest of the task graph; segmenting each of the one or more islands into Strongly Connected Components (SCCs); determining cycles in each of the SCCs; and breaking the cycles to provide the DAG. The segmenting each of the one or more islands into the SCCs can utilize Kosaraju's Algorithm. The determining cycles in each of the SCCs can utilize Johnson's Algorithm. The breaking the cycles to provide the DAG can include breaking as many of the cycles as necessary such that the dependency graph is a finite directed graph with no directed cycles. The breaking the cycles can include determining which task in an associated cycle has a highest probability of not requiring to be re-run if that task is run with predicted input; and breaking the associated cycle at that task. The software application can be a network validation application configured to verify optical viability of paths in an optical network.

In another embodiment, a server includes a plurality of processors; and memory storing instructions that, when executed, cause the plurality of processors to for a software application including a plurality of tasks which are cyclic interdependent tasks, segment the plurality of tasks into a task graph with vertices including the plurality of tasks and edges including interdependencies between the plurality of tasks; process the task graph into a dependency graph which is a Directed Acyclic Graph (DAG); and execute the plurality of tasks in a parallel manner on the plurality of processors based on the dependency graph. The memory storing instructions that, when executed, further cause the plurality of processors to utilize semantic analysis to predict input and output for the plurality of tasks and utilizing data balls which are predicted outputs as inputs to one or more tasks. The task graph can be processed into the dependency graph by a determination of one or more islands in the task graph which are disconnected completely from the rest of the task graph; segmentation of each of the one or more islands into Strongly Connected Components (SCCs); a determination of cycles in each of the SCCs; and the cycles being broken to provide the DAG. The segmentation of each of the one or more islands into the SCCs can utilize Kosaraju's Algorithm. The determination of cycles in each of the SCCs can utilize Johnson's Algorithm. The cycles can be broken to provide the DAG by breaking as many of the cycles as necessary such that the dependency graph is a finite directed graph with no directed cycles. The cycles can be broken to provide the DAG by: a determination of which task in an associated cycle has a highest probability of not requiring to be re-run if that task is run with predicted input; and the associated cycle is broken at that task. The software application can be a network validation application configured to verify optical viability of paths in an optical network.

In a further embodiment, a non-transitory computer-readable medium including instructions that, when executed, cause a plurality of processors to perform the steps of, for a software application including a plurality of tasks which are cyclic interdependent tasks, segmenting the plurality of tasks into a task graph with vertices including the plurality of tasks and edges including interdependencies between the plurality of tasks; processing the task graph into a dependency graph which is a Directed Acyclic Graph (DAG); and causing execution of the plurality of tasks in a parallel manner based on the dependency graph. The instructions that, when executed, further cause a plurality of processors to perform the steps of utilizing semantic analysis to predict input and output for the plurality of tasks and utilizing data balls which are predicted outputs as inputs to one or more tasks. The processing the task graph can include determining one or more islands in the task graph which are disconnected completely from the rest of the task graph; segmenting each of the one or more islands into Strongly Connected Components (SCCs); determining cycles in each of the SCCs; and breaking the cycles to provide the DAG. The segmenting each of the one or more islands into the SCCs can utilize Kosaraju's Algorithm; the determining cycles in each of the SCCs can utilize Johnson's Algorithm; the breaking the cycles to provide the DAG can include breaking as many of the cycles as necessary such that the dependency graph is a finite directed graph with no directed cycles; and the breaking the cycles can include determining which task in an associated cycle has a highest probability of not requiring to be re-run if that task is run with predicted input; and breaking the associated cycle at that task.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
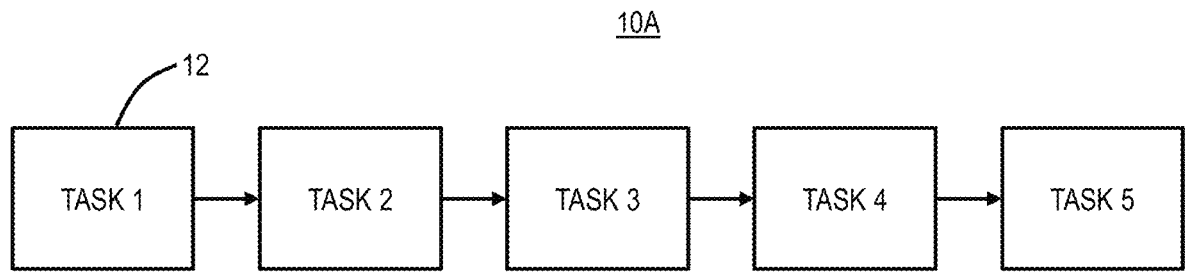
FIGS. 1 and 2 are diagrams of two example software applications with various tasks illustrated logically showing dependencies between each task.

In various embodiments, the present disclosure relates to scalable task scheduling systems and methods for cyclic interdependent tasks using semantic analysis. The systems and methods provide various computing techniques to solve the challenging problem of scalability and performance in task scheduling of highly interdependent tasks with circular dependencies. Specifically, the systems and methods include, for a software application including a plurality of tasks which are cyclic interdependent tasks, segmenting the plurality of tasks into a task graph with vertices including the plurality of tasks and edges including interdependencies between the plurality of tasks; processing the task graph into a dependency graph which is a Directed Acyclic Graph (DAG); and causing execution of the plurality of tasks in a parallel manner based on the dependency graph.

The systems and method use applied graph theory to process interdependencies of tasks into a task graph which is, in turn, processed to a dependency graph which is a DAG. A graph algorithm pipeline is used on the task graph for transformation, and dependency injections are tasks which can be scheduled to run in parallel providing improvements to performance and scalability. The cyclic dependencies are resolved using Johnson's algorithm and an input predictability factor. The conversion of a monolith application into well-defined tasks with clear input/output definitions and representations in the form of a task graph allows code maintainability and opens its use in microservices infrastructure in the cloud.

The systems and methods utilize input predictability and a non-linearity factor to determine when to use the various techniques. A software with tasks whose non-linearity index is low, i.e., the tasks configured are generally sequential in nature, and its input predictability is also low, benefits least from the systems and methods. Whereas software with high input predictability and low (or high) non-linearity factors are a good fit and vice versa.

The systems and methods use the semantics of the applied scenario to predict the input/output of tasks. This approach also allows persisted/estimated data to be used in running a task. Input predictions are made using the application's intrinsic knowledge. The systems and methods are scalable allowing the user to run scheduled tasks in parallel using parallel processing techniques. In an example application for optical network validation, input data balls for simulation tasks are predicted using link engineering parameters such as upstream amplifier provisioning, amplifier ripple effects, amplifier tilt, etc. The systems and methods further include plug and play of input/output data using machine learning algorithm predictions, statistical estimations, and data persistence.

Example Network Validation Application

Optical (photonic) networks generally include modulated optical channels propagating over an optical fiber with in-line devices such as amplifiers, repeaters, filters, etc. Ideally, an optical channel propagates from source to destination all-optically. Optical networks can be planned and validated using a network validation applications, such as OnePlanner available from Ciena Corporation, the applicant of the present application. A network validation application typically allows users to plot/visualize network elements over a geographic region, place services (e.g., wavelengths, Time Division Multiplexed (TDM) services, packet services, etc.), validate the services, etc. For example, at the photonic layer, optical viability can be verified based on simulation data, performance monitoring data, etc. As described herein, optical viability ensures an optical service has appropriate Optical Signal to Noise Ratio (OSNR) values and receiver power, i.e., that the optical signal can propagate from source to destination without errors (or with errors that are correctable via Forward Error Correction (FEC)).

An example network validation application is described in commonly-assigned U.S. Pat. No. 8,761,610, issued Jun. 24, 2014, and entitled "Methods and systems for the performance analysis of fiber optic networks," the contents of which are incorporated herein by reference. U.S. Pat. No. 8,761,610 states that the current state of desktop computers circa 2006 takes several hours to simulate the propagation of a relatively few 10 Gb/s channels over ~1000 km of fiber. U.S. Pat. No. 8,761,610 addresses these limitations by providing an alternative approach to optical signal propagation modeling. Since U.S. Pat. No. 8,761,610, there has been an exponential growth in the number of network paths which require verification due to the increase in the number of deployed network elements, the growth in the number of optical services, and the introduction of flexible grid services which allows each channel to occupy a variable amount of optical spectrum. To this end, there are additional requirements to speed up verification times to minutes or seconds.

The foregoing descriptions of the systems and methods are presented with the network validation application as an example. A network validation application includes many inter-dependent tasks (high non-linearity factor) and high input predictability. Those skilled in the art will recognize other types of computer applications are also contemplated, specifically applications which also exhibit a high non-linearity factor and high input predictability.

Non-Linearity Index and Input Predictability

Figure 2:
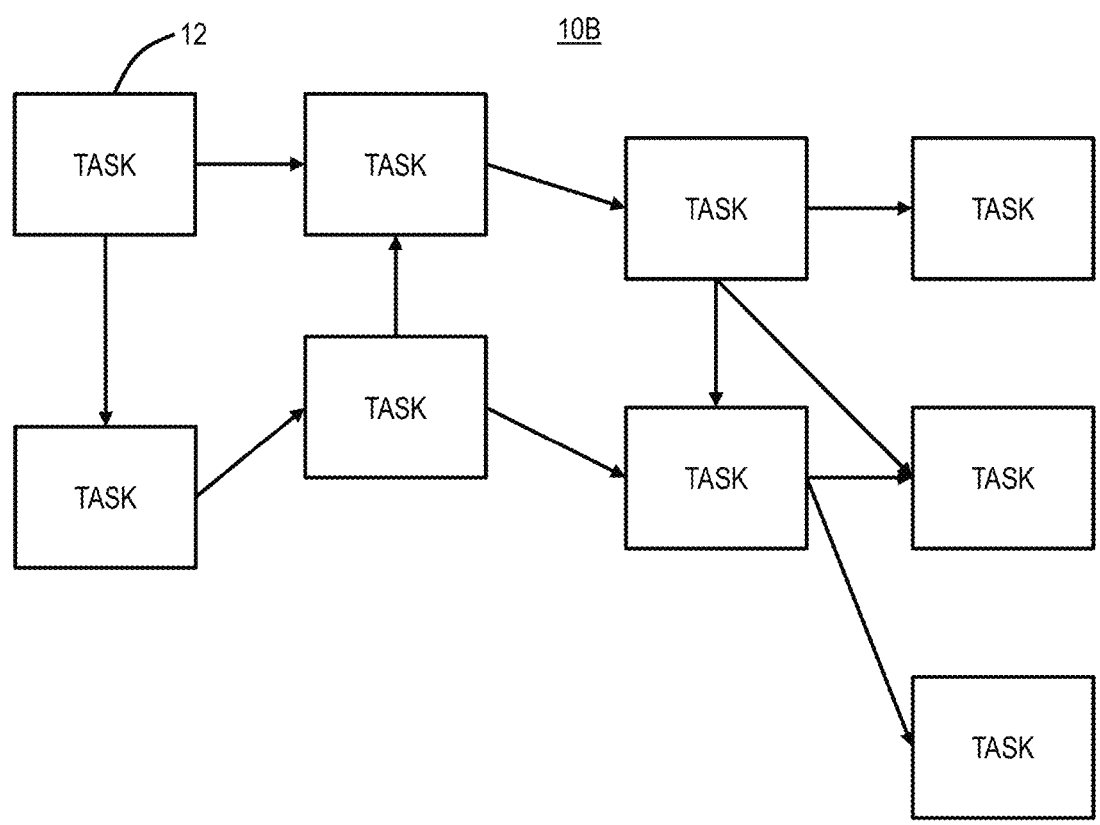

The terms "non-linearity index/factor" and "input predictability" are presented herein to determine if a computer application is a candidate for the systems and methods. Again, the systems and methods are useful for monolithic software applications wherein the overall non-linearity index is high, and the input predictability is high. The non-linearity index of a software monolith can be roughly calculated by the average number of branch out tasks from every task of the software application. FIGS. 1 and 2 are diagrams of two example software applications 10A, 10B with various tasks 12 illustrated logically showing dependencies between each task 12. Again, the task 12 is a unit of execution or a unit of work and the task 12 can also be referred to as a process, lightweight process, thread (for execution), step, request, or query (for work). A software application 10A, 10B includes multiple tasks 12. Also, the tasks 12 can have inter-dependencies/circular dependencies between one another.

For example, in FIG. 1, the task 1's outputs are required as the input to task 2 whose outputs are required as the input to task 3, etc. The software application 10A is linear and has a non-linearity index of 1, i.e., on average each task is followed by one other task. The non-linearity index is a measure of how many tasks follow each task on average. In FIG. 2, the software application 10B shows a more typical case where the tasks 12 have mesh interconnectivity (dependency). The software application 10B has a non-linearity index of 1.22; there are 9 tasks and 11 dependencies between the tasks 12 (11/9=1.22). The more the non-linearity (or mesh-ness) in the software applications 10A, 10B, the more advantages are seen from the performance optimizations described herein.

The other aspect is input predictability which is an assessment of the tasks 12 suggesting how easy/difficult it is to predict or estimate the inputs of a task 12 in the software monolith. This feature helps in an overall performance boost in the situation of inter-dependent or circularly dependent set of tasks. The input predictability can be evaluated using machine learning algorithms or statistical estimation of input/output data of the tasks 12. High input predictability means some tasks can be run with estimated or predicted input data. These tasks can be ones that are cyclic interdependent tasks. By running these tasks with estimated or predicted input data, a cycle can be broken, allowing for parallel execution (versus sequential execution).

Tasks and Data Balls

Figure 3:
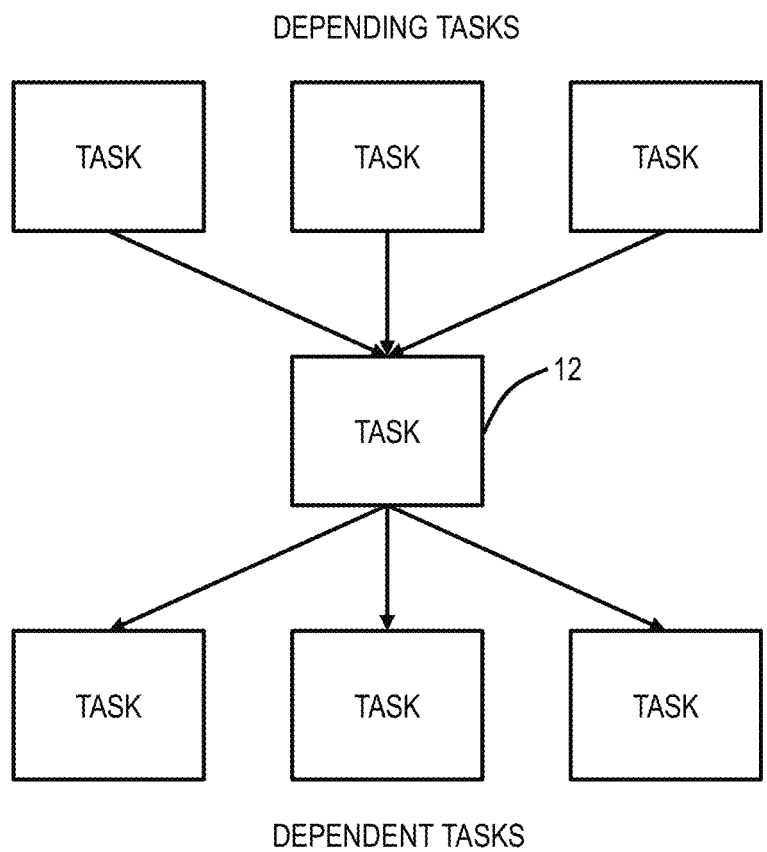
FIG. 3 is a block diagram defining a task in a software application.
Figure 4:
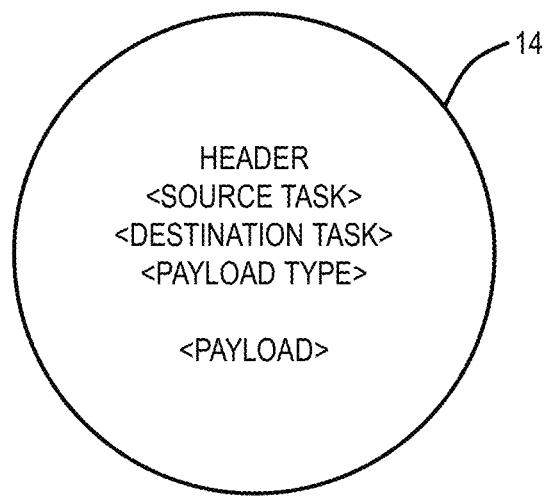
FIG. 4 is a diagram defining a data ball model.
Figure 5:
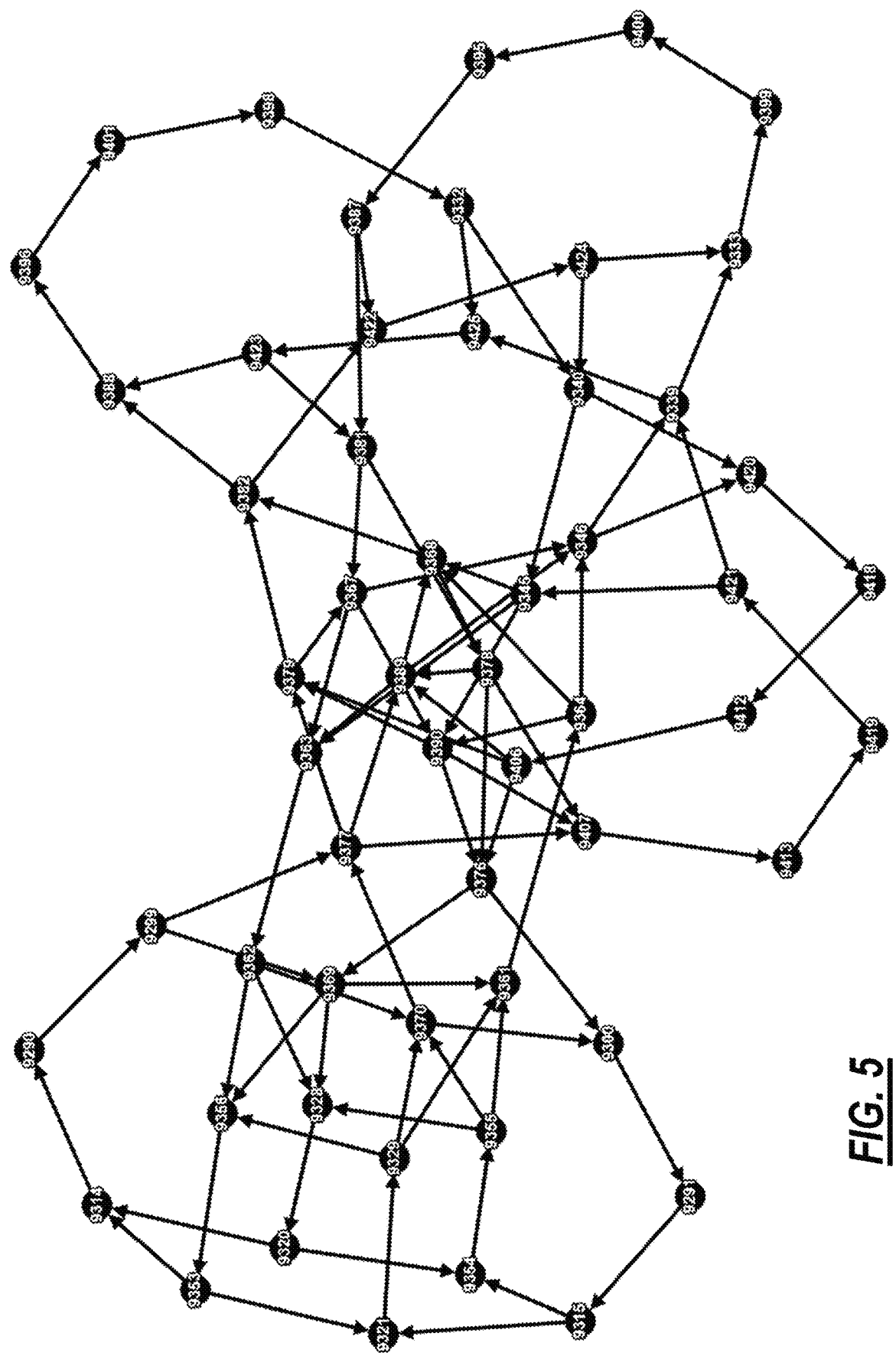
FIG. 5 is a diagram of an example network validation application which was a software monolith converted into inter-dependent tasks.

FIG. 3 is a block diagram defining a task 12 in a software application 10. FIG. 4 is a diagram defining a data ball 14 model. FIG. 5 is a diagram of an example network validation application which was a software monolith converted into inter-dependent tasks 12. For the scalable task scheduling systems and methods, inputs include a list of tasks 12 and a list of data ball 14 models. In FIG. 3, the task 12 is a well-defined unit of work in the software application 10 which can include depending tasks 12 (tasks which precede the task 12 and provide input thereto) and dependent tasks 12 (tasks which follow the task 12 and use an output of the task 12 as an input). In FIGS. 3 and 5, it can be seen that dividing the software application 10 in such a manner with the tasks 12 leads to a graph-like model/representation for the entire software application 10. As is described herein, the graph-like model is a task graph which is processed to form a DAG so that execution can be parallelized.

The data ball 14 model illustrates data modeling in the scalable task scheduling systems and methods where the real data is abstracted from the overall task management. A data ball 14 is a data structure with a header and payload, e.g., similar to an Internet Protocol (IP) packet. The header of the data ball 14 signifies the source task which created it, and destination tasks signify what tasks this data ball 14 is destined to. Each task 12 may consume one or more data balls 14 and may produce one or more data balls 14. The definition of the data ball 14 can be extended to persistent systems where it is desired to persist internal data between tasks or use predictable values using advanced machine learning methodologies.

With high input predictability, it is possible to predict or estimate the data balls 14 needed for some of the tasks 12 so that the task graph can be processed to form the DAG.

Scalable Task Scheduling Pipeline

Figure 6:
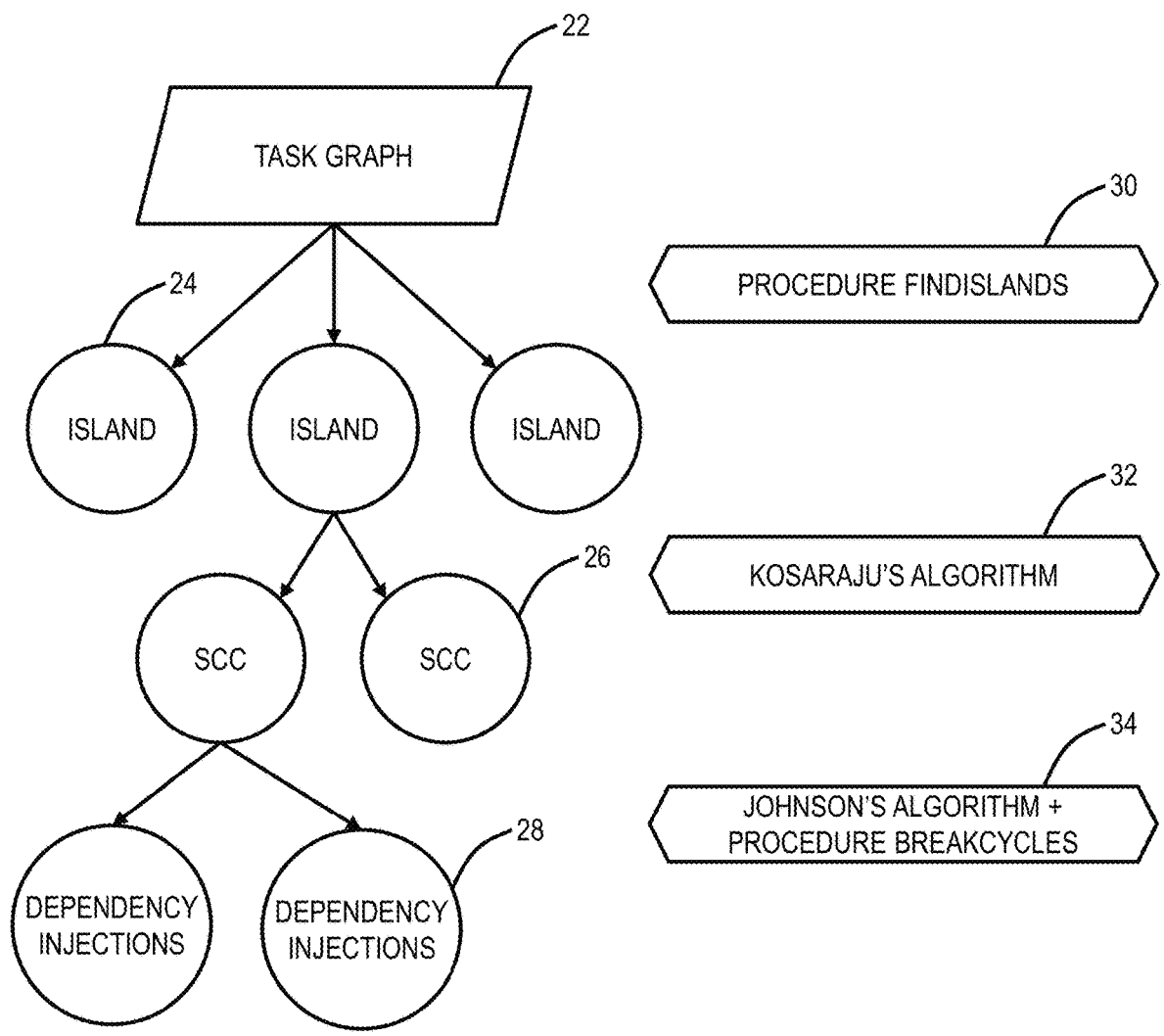
FIG. 6 is a diagram of a scalable task scheduling pipeline.

FIG. 6 is a diagram of a scalable task scheduling pipeline 20. The scheduling pipeline 20 includes a task graph 22, islands 24, Strongly Connected Components (SCC) 26, and dependency injections 28. The task graph 22 is formally defined as a directed graph which may or may not have cycles. FIG. 5 is an example of a task graph 22 with cycles. In the task graph 22, vertices represent tasks 12 and edges represent dependencies between tasks 12. A cycle in a graph means a vertex is reachable from itself. For example, in FIG. 5, there is a cycle between tasks 9353, 9314, 9290, 9299, 9369, and 9356. In the case of task 12 execution, this is problematic requiring the tasks 12 in a cycle to be performed sequentially. An objective here is to process the task graph 12 to make it a DAG dependency graph which has no cycles. This is done through graph algorithms and utilizing the high input predictability to break (elementary) cycles.

Each island 24 is a subgraph of the task graph 22 which is disconnected completely from the rest of the task graph 22. Any task graph 22 can have a minimum of one island and a maximum of n islands (n is an integer which is greater than or equal to 1) where n is the number of nodes in the task graph.

The objective of the scalable task scheduling pipeline 20 is to analyze a software application 10 with associated tasks 12 to create a graph representation of the tasks 12, i.e., the task graph 22. The task graph 22 is then processed to create a Directed Acyclic Graph (DAG), and this DAG can be used to assign the tasks 12 for execution in a multi-core processor environment.

A procedure FindIslands 30 is a process which breaks the task graph 22 into one or more islands 24. For example, the procedure FindIslands 30 analyzes the tasks 12 in the software application to determine which tasks form the islands 24.

Figure 7:
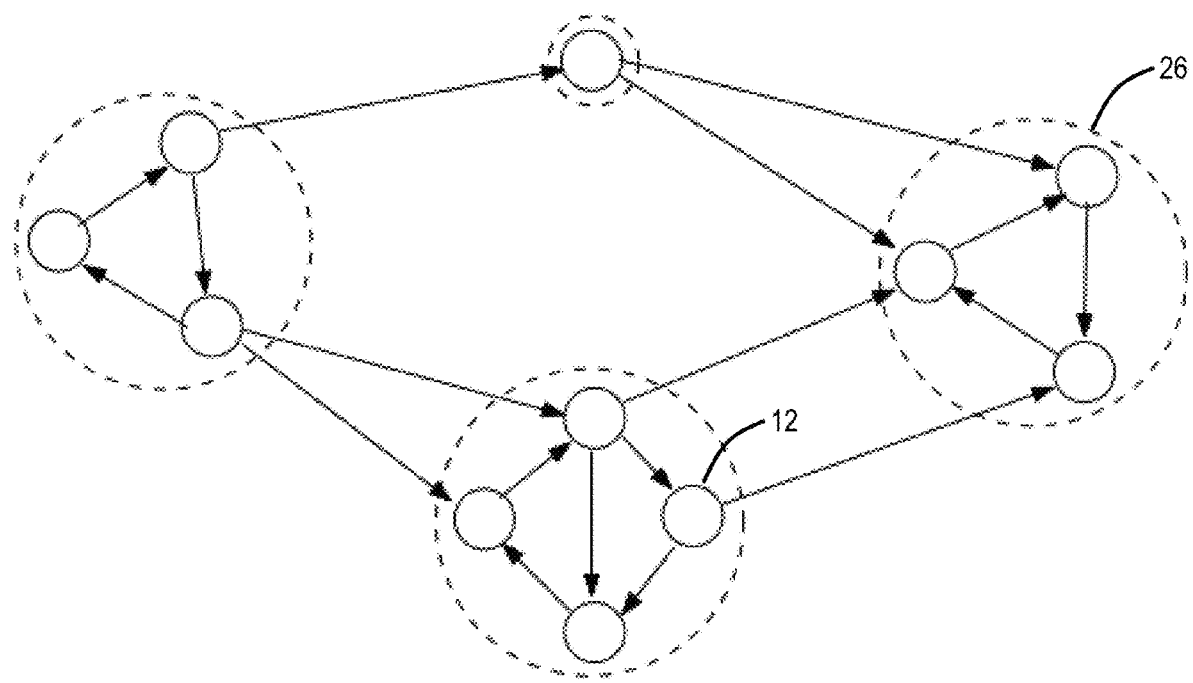
FIG. 7 is a graph of Strongly Connected Components (SCC) of a directed graph.

FIG. 7 is a graph of SCCs 26 of a directed graph. In the mathematical theory of directed graphs, a graph is said to be strongly connected or disconnected based on whether every vertex is reachable from every other vertex. The SCC 26 or disconnected components of an arbitrary directed graph form a partition into subgraphs that are themselves strongly connected. The pipeline 20 can further break each island 24 include multiple SCCs 26 using Kosaraju's Algorithm 32. This is performed to narrow the search space for the cycle-finding algorithm. An important property of the SCC 26 is that no cycle can go across multiple SCCs.

Referring back to FIG. 6, Kosaraju's Algorithm 32 is described in "Notes on Strongly Connected Components" (2011), available online at theory.stanford.edu/~tim/w11/1/scc.pdf, the contents of which are incorporated herein by reference. Kosaraju's Algorithm 32 can include two passes of a depth-first search, and the output provides the SCC 26 from the islands 24 of the tasks 12 in the software application.

After finding multiple SCCs 26, the scalable task scheduling pipeline 20 implements Johnson's Algorithm 34 to find all (elementary) cycles in every SCC 26. Johnson's algorithm is a way to find the shortest paths between all pairs of vertices in a sparse, edge-weighted, directed graph. Johnson's Algorithm 34 is described in Donald B. Johnson, "Finding all the elementary circuits of a directed graph," March 1975, SIAM J. Comput., 4(1), 77-84. (8 pages), the contents of which are incorporated herein by reference.

After all the (elementary) cycles in the graph are obtained, these (elementary) cycles are broken to make the initial task graph 22 into a DAG. Such a transformation of the task graph 22 is referred to as the dependency injection 28. Specifically, a dependency (edge) in the (elementary) cycle is broken. As described herein, this is based on input predictability, i.e., which dependency (edge) in the (elementary) cycle has the highest input predictability such that it can be run with predicted/estimated data balls 14.

The DAG is a finite directed graph with no directed cycles. That is, the DAG includes finitely many vertices and edges, with each edge directed from one vertex to another, such that there is no way to start at any vertex v and follow a consistently-directed sequence of edges that eventually loops back to v again. Equivalently, a DAG is a directed graph that has a topological ordering, a sequence of the vertices such that every edge is directed from earlier to later in the sequence.

A procedure BreakCycles is performed to break as many cycles (found using Johnson's Algorithm 34) as necessary to make the task graph 22 into a DAG, i.e., to make the task graph acyclic. The procedure BreakCycles utilizes a data structure called Priority List to find out where a cycle should be broken.

Figure 8:
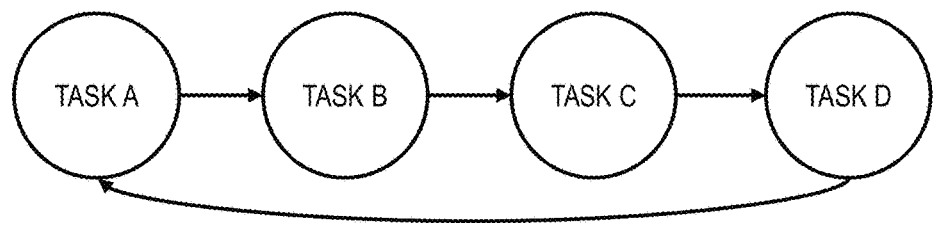
FIG. 8 is a graph of an example cycle in the task graph in the scalable task scheduling pipeline of FIG. 6.
Figure 9:
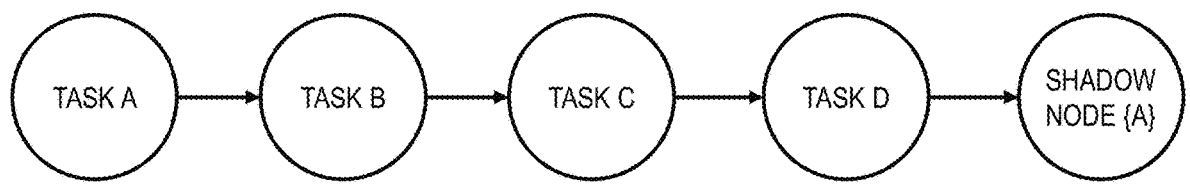
FIG. 9 is a graph of a cycle breaking procedure on the example cycle in FIG. 8.

FIG. 8 is a graph of an example cycle in the task graph 22. FIG. 9 is a graph of a breaking cycle procedure on the example cycle in FIG. 8. The Priority List is a sorted list of tasks 12 based on descending probabilities of which task may not be required to be re-run in case it is run with predicted input data balls 14. For example, in FIG. 8, an (elementary) cycle is shown between tasks A-B-C-D-A. This can also be called B-C-D-A-B, C-D-A-B-C or D-A-B-C-D invariably. To find what is the best way to break this cycle, it is determined which node in A, B, C, and D has the highest probability of no re-run requirement in case it is run with predicted input data balls 14.

In this example, suppose the task A is determined to have the highest priority over all other tasks in the given ring. Based on this decision, the edge D→A is broken, and a Shadow Node is created and connected with Task D. The Shadow Node has a dark edge to its corresponding Mortal Node (Every node that is not Shadow is a mortal node).

Predictability of input data balls 14 for a task 12 is directly proportional to the probability of this task 12 not requiring re-run in the case of the use of predicted input data balls 14, i.e., if the predicted input data balls 14 are wrong. Predicting input data balls 14 for a task 12 is application specific. It may vary from application to application and may require offline data analytics, data persistence, and machine learning capabilities.

Thus, the scalable task scheduling pipeline 20 includes processing the task graph 22 to convert it to directed acyclic dependency injections. Next, scenario-based semantics are used to predict input/output data balls 14 for tasks 12 to resolve cyclic inter-dependencies.

Once the scalable task scheduling pipeline 20 has converted all of the tasks 12 in a software application 10 into a DAG, the vertices of the DAG are the tasks 12 which can be provided (scheduled) on multiple core processors in parallel.

Predicted Input Data Balls

Figure 10:
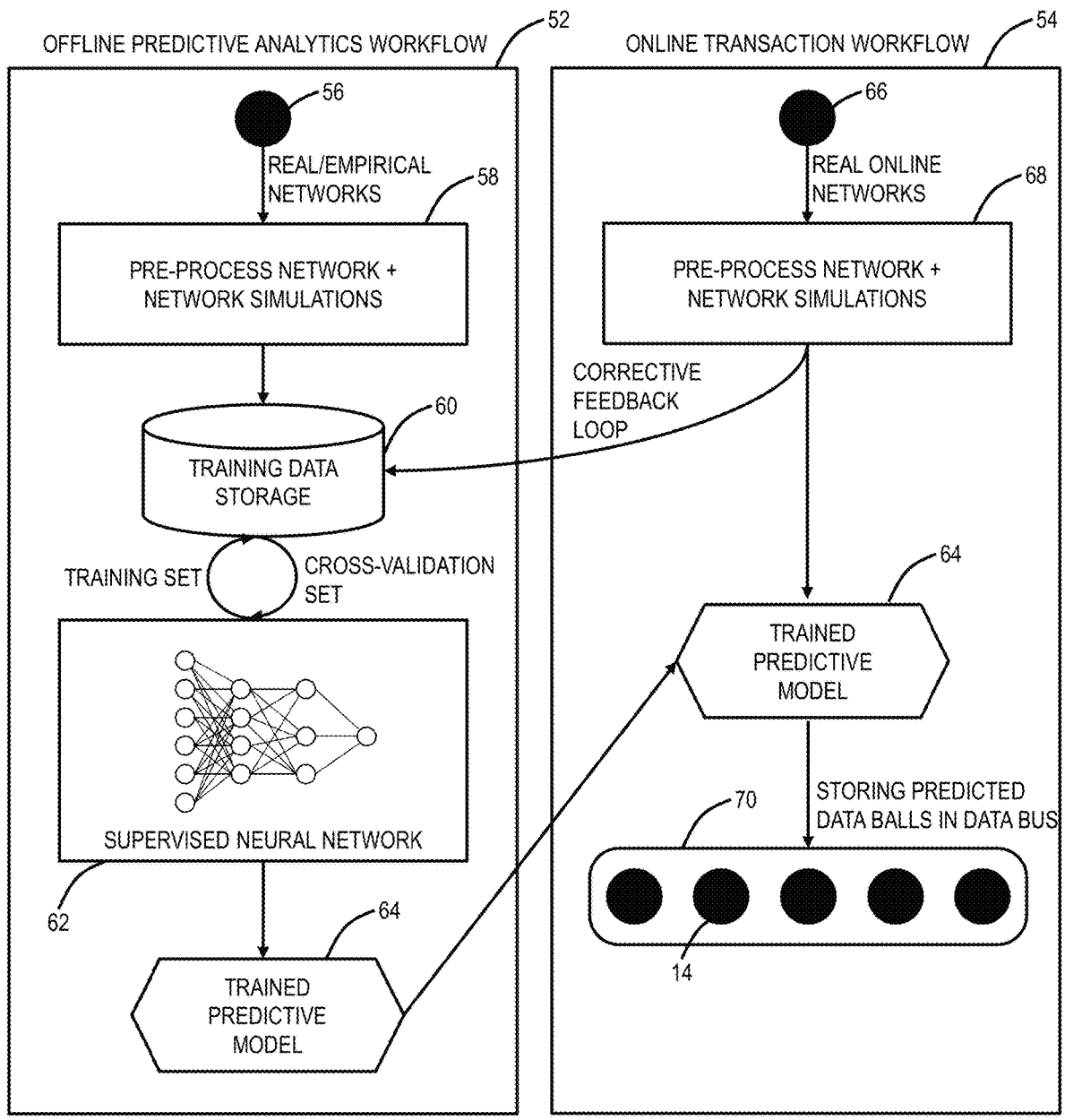
FIG. 10 is a flow diagram of a process for predicting input data balls.

FIG. 10 is a flow diagram of a process 50 for predicting input data balls 14. The process 50 includes an offline portion 52 and an online portion 54. Again, the scalable task scheduling pipeline 20 utilizes semantics of the applied scenario to predict the input/output of tasks. This approach also allows persisted/estimated data to be used in running a task. Input predictions are made using the application's intrinsic knowledge. Specifically, the process 50 provides an example of such input predictions.

The process 50 relates to the input predictability which is an assessment of how easy/difficult it is to predict or estimate the inputs of a task 12 in the software application 10. This feature helps in an overall performance boost in the situation of inter-dependent or circularly dependent set of tasks. This opens the possibility of use of machine learning algorithms or statistical estimation of input/output data of tasks 12.

For illustration purposes, the process 50 is described with reference to the network validation application example. In an optical network simulation, the process 50 can be used to predict input data balls 14 for simulation tasks using link engineering parameters such as upstream amplifier provisioning, amplifier ripple effects, amplifier tilt, etc. For the prediction process 50, a link engineering parameter estimator was created which is used for predicting input data for the application's tasks 12. FIG. 10 illustrates the process 50 for the link engineering parameter estimator.

In the offline portion 52, real and/or empirical network data 56 is provided and pre-processed/simulated 58 and stored as training data 60. The training data 60 is cross-validated/trained to utilize a supervised neural network 62 to provide a trained predictive model 64. In the online portion 52, real online network data 66 is provided and pre-processed/simulated 68 through the trained predictive model 64. The real online network data 66 is also used in a corrective feedback loop with the training data 60. The output of the trained predictive model 64 with the real online network data 66 provides predicted data balls 14 which are stored in a data bus 70.

Pipeline Details

Figure 11:
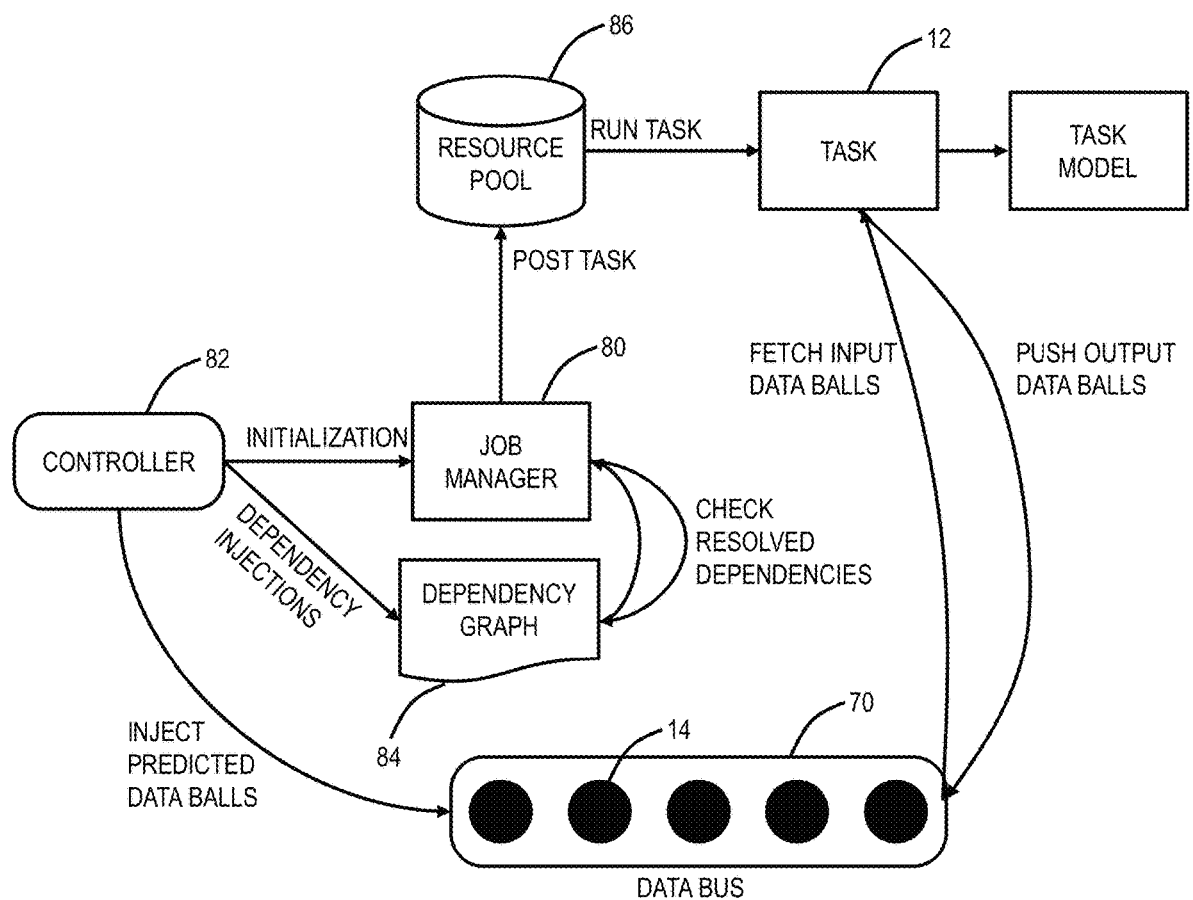
FIG. 11 is a flow diagram illustrating interactions with a job manager for implementing the scalable task scheduling pipeline of FIG. 6 and the process of FIG. 10 for predicting input data balls.

FIG. 11 is a flow diagram illustrating interactions with a job manager 80 for implementing the scalable task scheduling pipeline 20 and the process 50 for predicting input data balls 14. A controller 82 is the owner of the interface between different entities of the scalable task scheduling pipeline 20 and the process 50. The controller 82 is responsible for the job manager's 80 initialization and dependency injections in a Dependency Graph (DG) 84. Also, the controller 82 can inject predicted data balls 14 in the data bus 70.

The DG 84 is a DAG obtained from the Dependency Graph (DG) which is used to define dependencies of different tasks 12 on one another. The DG 84 defines when a task 12 is ready to run, based on when all its dependencies are resolved.

A resource pool 86 includes process management. The resource pool 86 can be a multi-process engine or a multi-thread management engine.

The data bus 70 is a data management entity. The data bus 70 can be a messaging queue following a publisher-subscriber design pattern. The data bus 70 stores and manages data balls 14 which were defined and discussed earlier.

The job manager 80 has the responsibility of interacting with the DG 84, the resource pool 86, and the data bus 70.

A node in the DG 84 symbolizes a task 12 in a passive state. A task 12 becomes active when it is 'Resolved.' At that point, the job manager 80 can activate this task 12 by initializing it with required data balls 14.

An edge in the DG 84 symbolizes a one-way dependency of 'from' node on 'to' node.

The DG 84 defines states in which a node can be at any instance. The following are the states for a DG 84 node:

| State | Definition |
|---|---|
| Un-Resolved | A node is in the unresolved state when it has one or more dependencies in an 'un Done' state. |
| Resolved | A node is in Resolved state when all its dependencies are in a 'Done' state. |
| Running | A node is in Running state when the job manager 80 has taken the responsibility of this node to execute it. |
| Done | A node is in the done state when the job manager 80 has finished its execution and notified DG 84 to mark it done. |

An edge in the DG 84 symbolizes a one-way dependency of 'from' node on 'to' node.

The following table illustrates various actions between node states.

| STATE FROM | STATE TO | Node Type | Trigger |
|---|---|---|---|
| Un-Resolved | Resolved | DG Standard, DG Shadow | When all dependencies are done. |
| Un-Resolved | Running | — | — |
| Un-Resolved | Done | DG Start, DG End | For start and end nodes only. |
| Resolved | Running | DG Standard, DG Shadow | Notify-Job-Push |
| Resolved | Done | — | — |
| Resolved | Un-Resolved | — | — |
| Running | Done | DG Standard, DG Shadow | Notify-Completion, other Notify Triggers |
| Running | Un-Resolved | — | — |
| Running | Resolved | DG Standard, DG Shadow | |
| Done | Un-Resolved | DG Standard, DG Shadow | In cases of Re-Run required and all dependencies are not fulfilled. |
| Done | Resolved | DG Standard, DG Shadow | In cases of Re-Runs required and all dependencies are fulfilled |
| Done | Running | — | — |

In effect, a software application 10 is broken down into tasks 12 which are mapped to the DG 84 via the scalable task scheduling pipeline 20 and the process 50 predicts input data balls 14. The job manager 80 is configured to manage execution of the tasks 12, such as in a multi-core processor system.

Process

Figure 12:
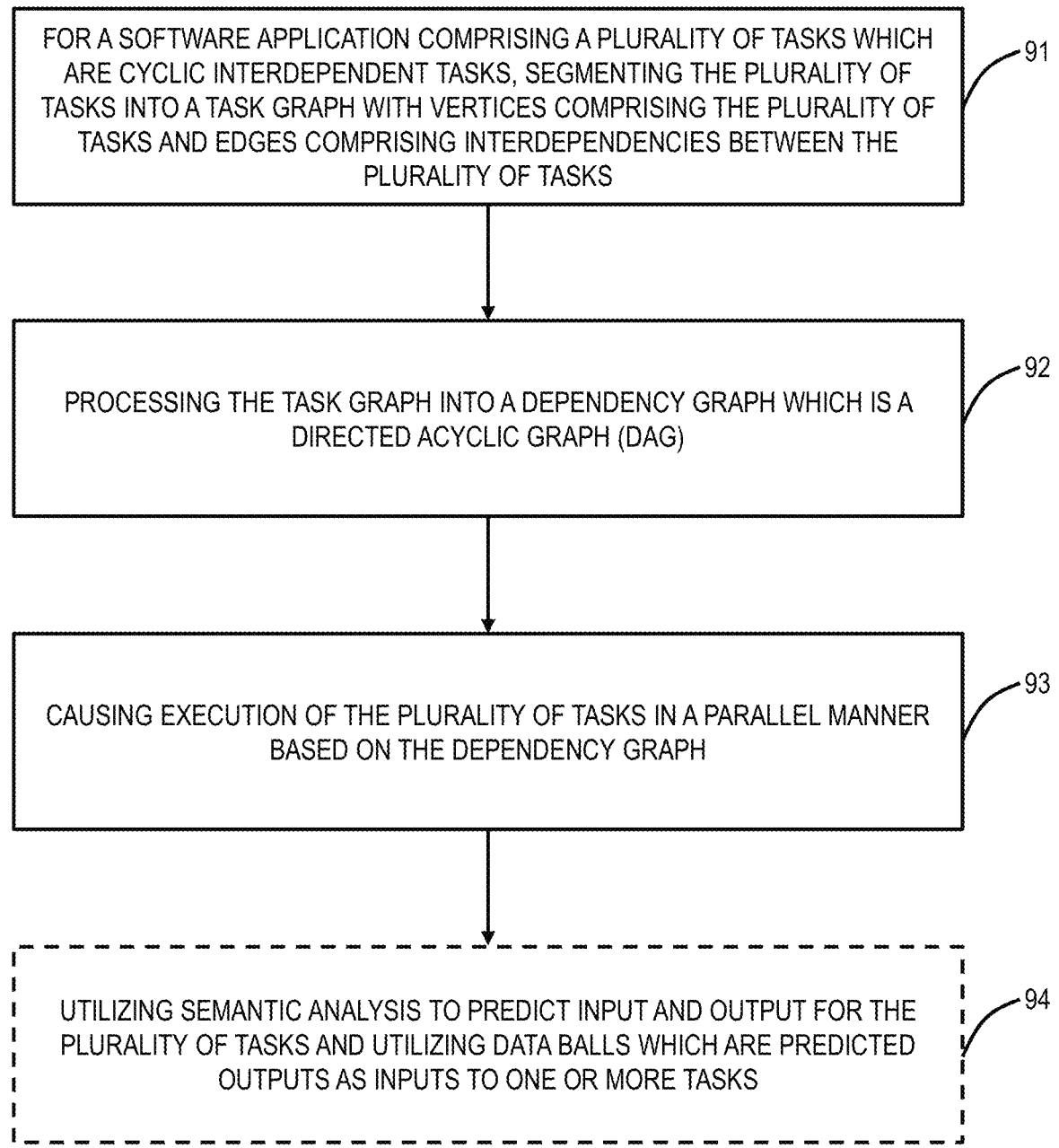
FIG. 12 is a flowchart of a scalable task scheduling process for cyclic interdependent tasks using semantic analysis.

FIG. 12 is a flowchart of a scalable task scheduling process 90 for cyclic interdependent tasks using semantic analysis. The scalable task scheduling process 90 includes, for a software application including a plurality of tasks which are cyclic interdependent tasks, segmenting the plurality of tasks into a task graph with vertices including the plurality of tasks and edges including interdependencies between the plurality of tasks (step 91); processing the task graph into a dependency graph which is a Directed Acyclic Graph (DAG) (step 92); and causing execution of the plurality of tasks in a parallel manner based on the dependency graph (step 93). The scalable task scheduling process 90 can further include utilizing semantic analysis to predict input and output for the plurality of tasks and utilizing data balls which are predicted outputs as inputs to one or more tasks (step 94).

The processing the task graph can include determining one or more islands in the task graph which are disconnected completely from the rest of the task graph; segmenting each of the one or more islands into Strongly Connected Components (SCCs); determining (elementary) cycles in each of the SCCs; and breaking the (elementary) cycles to provide the DAG. The segmenting each of the one or more islands into the SCCs can utilize Kosaraju's Algorithm. The determining (elementary) cycles in each of the SCCs can utilize Johnson's Algorithm.

The breaking the (elementary) cycles to provide the DAG can include breaking as many of the (elementary) cycles as necessary such that the dependency graph is a finite directed graph with no directed cycles. The breaking the (elementary) cycles can include determining which task in an associated (elementary) cycle has the highest probability of not requiring to be re-run if that task is run with predicted input; and breaking the associated (elementary) cycle at that task. The software application can be a network validation application configured to verify the optical viability of paths in an optical network.

Results

Figure 13:
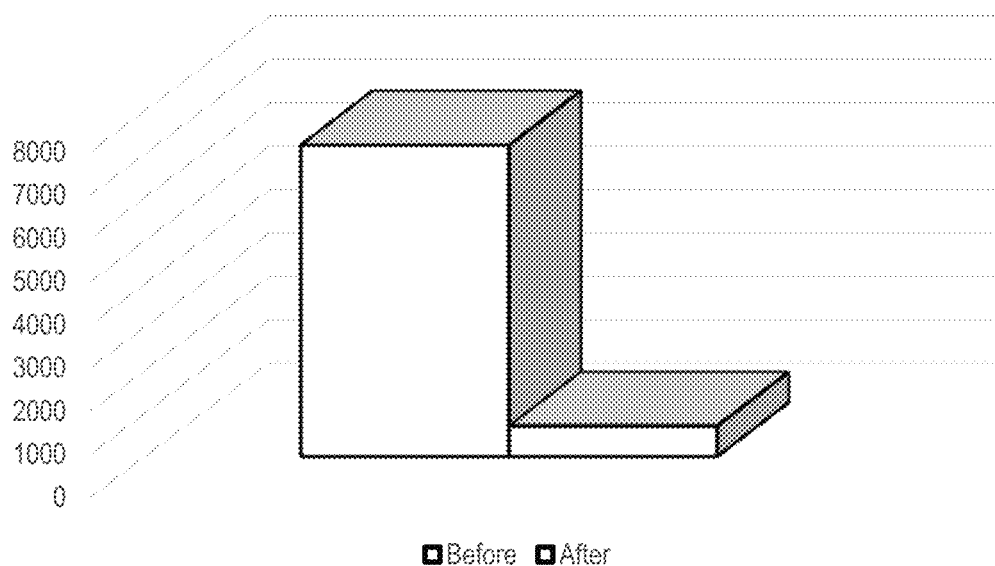
FIG. 13 are two graphs G1, G2 illustrating example results of the scalable task scheduling process.
Figure 13:
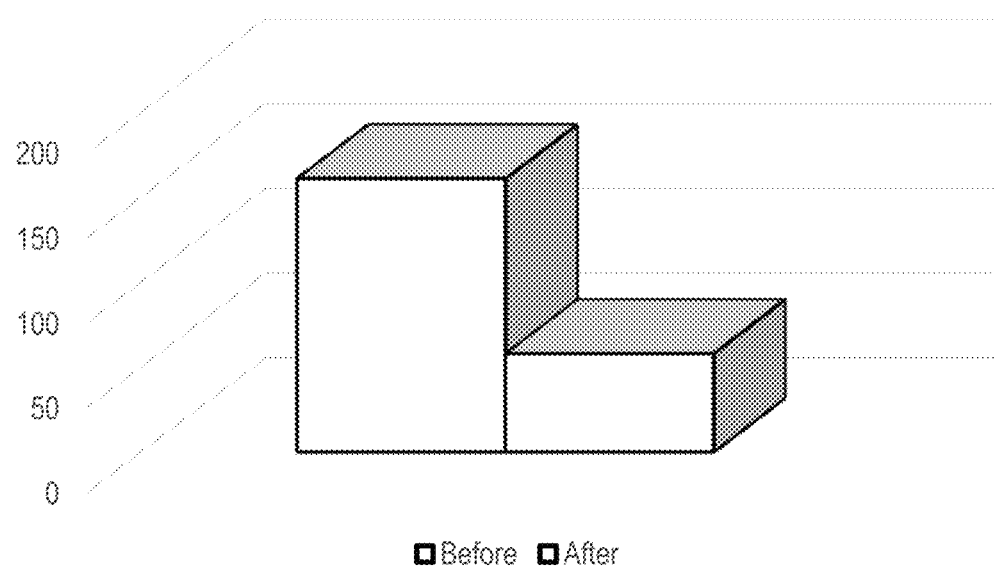

FIG. 13 are two graphs G1, G2 illustrating example results of the scalable task scheduling process 90. Here, the scalable task scheduling process 90 is applied to a network validation application. The following describes example operations on the same network without (before) and with (after) the scalable task scheduling process 90. The example operations were performed on an Intel® Xeon® Processor E5-2687 W v3 (3.10 GHz), 10 C/20T (10 cores, 20 threads), 256 GB RAM. The graph G1 relates to an example mesh network with 1043 nodes, 236 edges, and 8472 verification paths.

Performance numbers for this network indicate an overall ~90% runtime improvements with parallel processing over purely sequential processing. As the non-linearity index of this network is high, better improvements are seen in parallel processing.

The graph G2 relates to a mesh network with 29 nodes, 26 edges, and 2934 verification paths. Performance numbers for this network indicate overall ~64% runtime improvements with parallel processing over purely sequential processing.

In conclusion, for the network validation application, the performance improvement depends upon host system configurations and network topologies. Networks which are highly meshed show better runtime numbers, which is evident from the above two case studies.

Server

Figure 14:
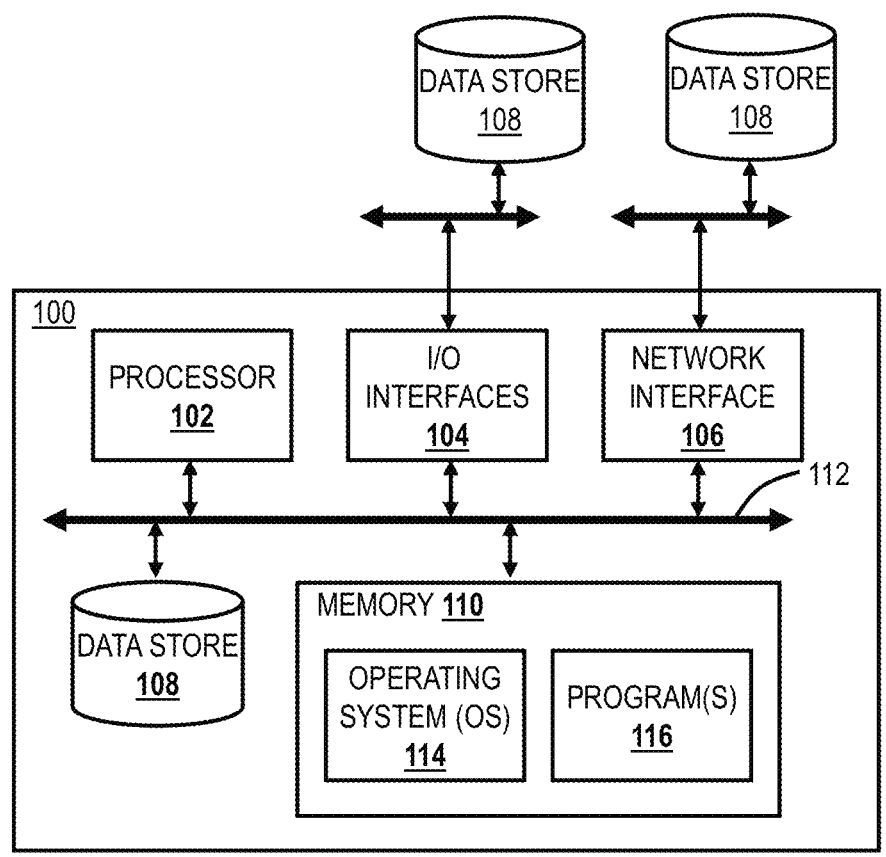
FIG. 14 is a block diagram of a server which has multi-core processors for executing tasks associated with a software application.

FIG. 14 is a block diagram of a server 100 which has multi-core processors 102 for executing tasks 12 associated with a software application 10. The server 100 can be a digital computer that, in terms of hardware architecture, generally includes a processor 102, input/output (I/O) interfaces 104, a network interface 106, a data store 108, and memory 110. It should be appreciated by those of ordinary skill in the art that FIG. 14 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, communicate data to and from other devices via the network interface 106, and to generally control operations of the server 100 pursuant to the software instructions. The I/O interfaces 104 can be used to receive user input from and/or for providing system output to one or more devices or components.

The network interface 106 can be used to enable the server 100 to communicate on a network. The network interface 106 can include, for example, an Ethernet card or adapter or a wireless local area network (WLAN) card or adapter. The network interface 106 can include address, control, and/or data connections to enable appropriate communications on the network. A data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. In one example, the data store 108 can be located internal to the server 100 such as, for example, an internal hard drive connected to the local interface 112 in the server 100. Additionally, in another embodiment, the data store 108 can be located external to the server 100 such as, for example, an external hard drive connected to the I/O interfaces 104 (e.g., SCSI or USB connection). In a further embodiment, the data store 108 can be connected to the server 100 through a network, such as, for example, a network attached file server.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In another embodiment, the memory 110 includes instructions that, when executed, cause the plurality of processors 102 to, for a software application including a plurality of tasks which are cyclic interdependent tasks, segment the plurality of tasks into a task graph with vertices including the plurality of tasks and edges including interdependencies between the plurality of tasks; process the task graph into a dependency graph which is a Directed Acyclic Graph (DAG); and execute the plurality of tasks in a parallel manner on the plurality of processors based on the dependency graph.

In a further embodiment, a non-transitory computer-readable medium includes instructions that, when executed, cause a plurality of processors to perform the steps of: for a software application including a plurality of tasks which are cyclic interdependent tasks, segmenting the plurality of tasks into a task graph with vertices including the plurality of tasks and edges including interdependencies between the plurality of tasks; processing the task graph into a dependency graph which is a Directed Acyclic Graph (DAG); and causing execution of the plurality of tasks in a parallel manner based on the dependency graph.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A scalable task scheduling method for cyclic interdependent tasks comprising:
   for a software application including a plurality of tasks which are cyclic interdependent tasks, segmenting the plurality of tasks into a task graph with vertices including the plurality of tasks and edges including interdependencies between the plurality of tasks;
   processing the task graph into a dependency graph which is a Directed Acyclic Graph (DAG) including
      determining one or more islands in the task graph which are disconnected completely from the rest of the task graph,
      segmenting each of the one or more islands into Strongly Connected Components (SCCs), and
      breaking cycles in each of the SCCs to provide the DAG, wherein the breaking the cycles is based on determining which task in an associated cycle has a highest probability of not requiring to be re-run if that task is run with predicted input; and
   causing execution of the plurality of tasks in a parallel manner based on the dependency graph.

2. The scalable task scheduling method of claim 1, further comprising:
   utilizing semantic analysis to predict input and output for the plurality of tasks and utilizing data balls which are predicted outputs as inputs to one or more tasks.

3. The scalable task scheduling method of claim 1, wherein the segmenting each of the one or more islands into the SCCs utilizes Kosaraju's Algorithm.

4. The scalable task scheduling method of claim 1, wherein the determining cycles in each of the SCCs utilizes Johnson's Algorithm.

5. The scalable task scheduling method of claim 1 wherein the breaking the cycles to provide the DAG includes breaking as many of the cycles as necessary such that the dependency graph is a finite directed graph with no directed cycles.

6. The scalable task scheduling method of claim 1, wherein the software application is a network validation application configured to verify optical viability of paths in an optical network.

7. A server comprising:
   a plurality of processors; and
   memory storing instructions that, when executed, cause the plurality of processors to
      for a software application including a plurality of tasks which are cyclic interdependent tasks, segment the plurality of tasks into a task graph with vertices including the plurality of tasks and edges including interdependencies between the plurality of tasks;
      process the task graph into a dependency graph which is a Directed Acyclic Graph (DAG), to process the task graph, the processor is configured to
         determine one or more islands in the task graph which are disconnected completely from the rest of the task graph,
         segment each of the one or more islands into Strongly Connected Components (SCCs), and
         break cycles in each of the SCCs to provide the DAG, wherein the cycles are broke based on a determination of which task in an associated cycle has a highest probability of not requiring to be re-run if that task is run with predicted input; and
      execute the plurality of tasks in a parallel manner on the plurality of processors based on the dependency graph.

8. The server of claim 7, wherein the memory storing instructions that, when executed, cause the plurality of processors to
   utilize semantic analysis to predict input and output for the plurality of tasks and utilizing data balls which are predicted outputs as inputs to one or more tasks.

9. The server of claim 7, wherein the segmentation of each of the one or more islands into the SCCs utilizes Kosaraju's Algorithm.

10. The server of claim 7, wherein the determination of cycles in each of the SCCs utilizes Johnson's Algorithm.

11. The server of claim 7, wherein the cycles are broken to provide the DAG by breaking as many of the cycles as necessary such that the dependency graph is a finite directed graph with no directed cycles.

12. The server of claim 7, wherein the software application is a network validation application configured to verify optical viability of paths in an optical network.

13. A non-transitory computer-readable medium comprising instructions that, when executed, cause a plurality of processors to perform the steps of:
for a software application including a plurality of tasks which are cyclic interdependent tasks, segmenting the plurality of tasks into a task graph with vertices including the plurality of tasks and edges including interdependencies between the plurality of tasks;
processing the task graph into a dependency graph which is a Directed Acyclic Graph (DAG) including
determining one or more islands in the task graph which are disconnected completely from the rest of the task graph,
segmenting each of the one or more islands into Strongly Connected Components (SCCs), and
breaking cycles in each of the SCCs to provide the DAG, wherein the breaking the cycles is based on determining which task in an associated cycle has a highest probability of not requiring to be re-run if that task is run with predicted input; and
causing execution of the plurality of tasks in a parallel manner based on the dependency graph.

14. The non-transitory computer-readable medium of claim 13, wherein the instructions that, when executed, cause a plurality of processors to perform the steps of:
utilizing semantic analysis to predict input and output for the plurality of tasks and utilizing data balls which are predicted outputs as inputs to one or more tasks.

15. The non-transitory computer-readable medium of claim 13, wherein the processing the task graph comprises:
determining one or more islands in the task graph which are disconnected completely from the rest of the task graph;
segmenting each of the one or more islands into Strongly Connected Components (SCCs);
determining cycles in each of the SCCs; and
breaking the cycles to provide the DAG.

* * * * *